Nov. 6, 1945.   G. T. TOBIASSON   2,388,451
REACTOR
Filed March 24, 1941

INVENTOR
GEORGE T. TOBIASSON
BY
ATTORNEY

Patented Nov. 6, 1945

2,388,451

UNITED STATES PATENT OFFICE 2,388,451

REACTOR

George T. Tobiasson, Chicago, Ill., assignor to Universal Oil Products Company, Chicago, Ill., a corporation of Delaware Application March 24, 1941, Serial No. 384,865

6 Claims. (Cl. 23—288)

This is a continuation-in-part of my co-pending application Serial Number 357,002, filed September 16, 1940, which has matured into Patent No. 2,267,768.

The invention provides an improved form of reactor adapted to be used in conducting hydrocarbon conversion reactions of the type employing fixed beds of granular contact material or catalyst which is rapidly fouled or rendered relatively inactive by the deposition thereon of deleterious heavy conversion products.

Some of the best known catalytically promoted hydrocarbon conversion reactions of this general type are cracking, dehydrogenation, isomerization, cyclization and dehydrocyclization, hydrogen transfer reactions and the like. The features of the apparatus provided by the invention make it advantageous as a reactor in which to conduct the specific reactions mentioned, as well as all other catalytically promoted reactions and contact processes of the general type indicated. It is not limited to operations involving the catalytic conversion of hydrocarbons, but will be found useful in any process wherein frequent reactivation of a bed of catalyst or contact material is required.

It is common practice in operations of the character above mentioned to employ a plurality of reactors each containing one or more beds of granular contact material which, while in active state, is capable of promoting the desired conversion reaction and to effect conversion of the reactants in one or more of said reactors while previously used catalyst in one or more of the other reactors of the group is being reactivated for further use. Reactivation of the catalyst is ordinarily accomplished by burning the deleterious deposits of combustible material therefrom in a stream of hot oxidizing gases. Such reactivation is, of course, accompanied by the liberation of substantial quantities of heat and since the activity of the catalysts generally employed is permanently impaired or destroyed at high temperatures, provision must ordinarily be made for controlling the temperature of the catalyst bed during reactivation. This is usually accomplished by circulating a convective fluid which acts as a cooling medium in indirect heat transfer relation with the catalyst and the reactivating gas stream in the reactor.

On the other hand, the processing phase of the operating cycle is quite often endothermic and in such cases it is good practice to transfer heat from the reactor wherein reactivation is taking place to the reactor wherein conversion of the reactants is being accomplished in order to supply at least a portion of the heat required in the endothermic reaction.

In the present invention, instead of employing a plurality of reactors, each of which alternately serves as a zone for processing of the reactants and a zone in which reactivation of the catalyst is accomplished, I provide a reactor having a plurality of separate, superimposed beds of catalytic material with means for accomplishing conversion of the reactants and reactivation of the catalyst simultaneously in alternate catalyst beds. With this improved form of reactor, heat is transmitted directly from the catalyst beds in which reactivation of the catalyst is taking place and from the reactivating gas stream to the reactants undergoing conversion and to the adjacent catalyst beds in which conversion of the reactants is taking place. With the present invention, this is accomplished in a reactor of relatively simple form without the use of a special circulating stream of convective fluid such as is conventionally employed in processes involving simultaneously conducted endothermic and exothermic reactions.

The accompanying drawing diagrammatically illustrates one form of reactor embodying the features of the invention.

Fig. 1 of the drawing is an elevational view of the reactor shown partially in section.

Figure 1:
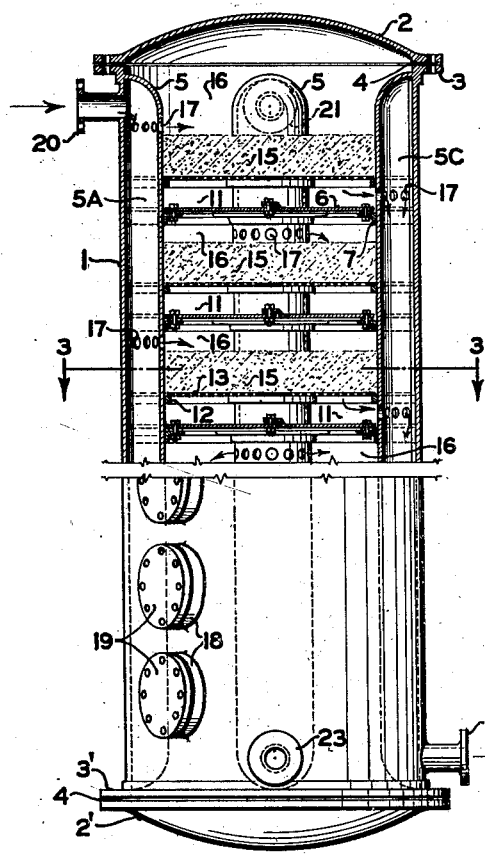
Figure 3:
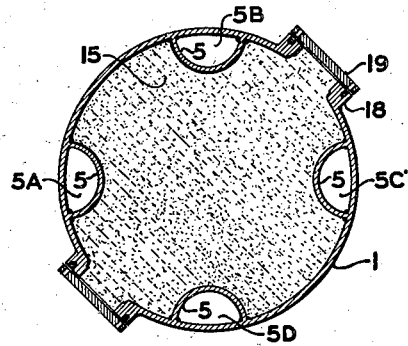
Fig. 3 is a cross-sectional view of the reactor illustrated in Fig. 1, this section being taken along the horizontal plane indicated by line 3—3 in Fig. 1.

Referring to the drawing, the outer substantially cylindrical shell of the reactor is indicated by the reference numeral 1 and, like the other portions of the vessel, is composed of suitable metal or alloy capable of withstanding the particular operating conditions to which it is subjected. The shell is provided with removable upper and lower flanged heads 2 and 2', respectively, which, when the vessel is in service, are bolted to the upper and lower flanges 3 and 3', respectively, by suitable bolts, not illustrated, gaskets 4 are provided between the companion flanges on the vessel and the heads to maintain tight joints at these points. It will, of course, be understood that either the upper or lower head may be formed integral with the shell, when desired, but preferably at least one of the heads is removable and covers a sufficient area of the space within the shell that the subsequently described partitions which separate the several vertical sections of the reactor and the perforate plates which support the beds of contact material may be inserted and removed through the opening provided when the detachable head or closure member is removed from the shell.

Four longitudinal conduits 5A, 5B, 5C and 5D spaced approximately 90 degrees apart and formed by joining the substantially semi-circular members 5 to the outer shell 1, by welding or in any other convenient manner, are provided within the shell. Two of the adjacent conduits thus formed comprise inlet conduits and distributing chambers for reactants to be processed and reactivating gases, while the other two conduits serve as collecting chambers and outlet conduits for products of the conversion reaction and for spent or partially spent reactivating gases. Inlet nozzles 20 and 21, provided at ports in shell 1, communicate with the two first named conduits and serve as inlet connections for the reactants and reactivating gases. Outlet nozzles 22 and 23 at other ports in shell 1 communicate with the other two conduits and serve as outlet connections for reactants and for spent or partially spent reactivating gases. Each of the conduits 5A, 5B, 5C and 5D is closed at its upper and lower ends.

The space enclosed between conduits 5A, 5B, 5C and 5D and that portion of shell 1 extending between these members is divided into a plurality of vertical sections by means of partition plates 6 which rest upon and are bolted to supporting angles 7 welded to the members and to the portion of shell 1 extending between these members at spaced points throughout the length of the shell. Gaskets 8 are preferably provided between the supporting angles 7 and the partition plates 6 to seal the joint therebetween. Preferably, the partition plates are divided, as illustrated at 9 in Fig. 2, along a diametrical line and provided with overlapping edges which are bolted together and provided with a gasket 10 therebetween to seal the joint. This construction facilitates assembly of the reactor and permits the removal of the two substantially semi-circular sections of each of the plates 6, after they are unbolted from each other and from the supporting angles, through the opening provided at the upper end of the reactor when the detachable upper head 2 is removed therefrom.

Figure 2:
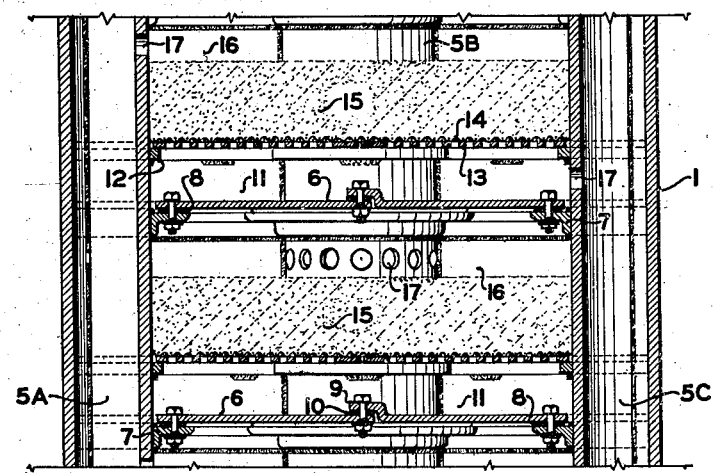
Fig. 2 is an enlarged detail shown in longitudinal section of a portion of the reactor of Fig. 1 illustrating two adjacent sections thereof in which separate beds of solid granular contact material are disposed.

At a short distance above each of the partitions 6, a perforate plate 14 is disposed and supported on members 12 which are welded or otherwise secured to the shell. Members 12 may be continuous around the periphery of the area enclosed between members and that portion of shell 1 extending between these members or they may be disposed at spaced points about the periphery. In case they are continuous, the distance between the inner surface of member 5 at diametrically opposite points is preferably somewhat less than the diametrical width of the partition plates along the same vertical plane, to facilitate insertion and removal of the latter from the shell. The perforate plates 13 are also preferably bifurcated along a diametrical line as indicated in Fig. 2 and may be overlapped at the joint thus formed, although this is not necessary and, therefore, not illustrated in the drawing. A suitable wire mesh or screen 14 may, when desired, be disposed above each of the perforate plates 13, particularly when the granular catalyst or contact material to be employed is of relatively small size, the screen being of sufficiently small mesh to retain the catalyst particles.

Above each of the perforate plates 13, a relatively shallow bed 15 of granular catalyst or contact material is disposed, each bed terminating short of the next higher partition plate 6 in the assembly so that a substantial space 16 is provided therebetween, this space being of approximately the same depth as space 11 provided between each partition 6 and the perforate plate 13 disposed therebetween.

The spaces 16 in alternate vertical sections of the reactor, formed by the partitions 6, communicate with the inlet conduit and distributing chamber 5A through openings 17 provided in the corresponding member 5 at the level of spaces 16. The other spaces 16 in alternate sections communicate with the inlet conduit and distributing chamber 5B through similar openings 17 provided in the corresponding member 5 at the level of spaces 16. Alternate spaces 11 between the partitions 6 and perforate plates 13 communicate with the collecting chamber and outlet conduit 5C through openings 17 provided in the corresponding member 5 at the level of spaces 11. The other alternate spaces 11 communicate with collecting chamber and outlet conduit 5D through openings 17 provided in the corresponding member 5 at the level of spaces 11. Thus, the only means of communication between inlet conduit 5A and outlet conduit 5C is through the openings 17, the spaces 16 and 11 and the bed of contact material disposed therebetween. Also, the only means of communication between inlet conduit 5B and outlet conduit 5D is through openings 17, spaces 16 and 11 and the catalyst bed disposed therebetween. Communication between conduits 5A and 5C is restricted to alternate sections of the reactor within which the catalyst beds are disposed and communication between conduits 5B and 5D is restricted to the other alternate section of the reactor within which the catalyst beds are disposed.

Suitable ports covered by removable flanges or closure members 19 are preferably provided in that portion of shell 1 between two of the conduits formed by members 5 and the shell 1 at spaced elevations corresponding to the locations of the catalyst beds. These ports and removable closure members permit inspection and replacement, when required, of the catalyst or contact material without disassembling the reactor.

To illustrate the utility of the improved form of reactor herein provided, the following description of a catalytic cracking operation employing the reactor illustrated is given.

The hydrocarbon oil to be cracked is supplied in heated vaporous state to the reactor through nozzle 20 and the vapors flood the communicating zone 5A and pass therefrom through openings 17 in the corresponding member 5 to the spaces 16 above the uppermost catalyst bed and each succeeding alternate catalyst bed in the reactor. The vapors then pass downward through the catalyst beds in these alternate sections of the reactor, wherein the cracking reaction takes place, and the resulting products pass through perforate plates 13 into the spaces 11 of the same sections, wherefrom they flow through the communicating openings 17 into conduit 5C and are directed therefrom through nozzle 21 to subsequent recovery equipment, not pertinent to the present invention and therefore not illustrated.

Simultaneous with the operation above described, reactivating gases comprising a major quantity of relatively inert components, such as combustion gases containing regulated minor amounts of air, are supplied in heated state to conduit 5B through nozzle 21 and pass therefrom through openings 17 in the corresponding member 5 into the spaces 16 above the second and each succeeding alternate catalyst bed of the reactor. The hot reactivating gases pass thence downward through the catalyst beds in these alternate sections of the reactor and burn deleterious deposits of heavy hydrocarbonaceous materials from the catalyst particles, the resulting spent or partially spent reactivating gases through the perforate plates 13 into the spaces 11 of these alternate sections of the reactor and thence through the communicating openings 17 into conduit 5D from which they are discharged through nozzle 23.

When it becomes necessary or desirable to reactivate the catalyst beds which have been employed for conducting the cracking reaction, the beds have which been undergoing reactivation are first substantially purged of oxygen-containing gases by discontinuing the supply of air to the reactivating gases and passing the hot inert components of the reactivating gas stream through these beds for a short time. The stream of vaporous hydrocarbons to be converted is then diverted from nozzle 20 and passed through nozzle 21 into conduit 5B, while the stream of hot inert components of the reactivating gas stream is diverted from nozzle 21 and passed through nozzle 20 into conduit 5A for a sufficient length of time to substantially purge the beds which have been previously employed for conducting the cracking reaction of fluid hydrocarbons. Following this purge air is again added to the reactivating gas stream and reactivation of the catalyst beds previously employed for conducting the cracking reaction is accomplished, while the previously reactivated beds are being employed to promote the cracking reaction. Thus, it will be apparent from the above that processing and reactivation are conducted simultaneously in different catalyst beds of the reactor and that each catalyst bed is alternately reactivated and employed for conducting the conversion reaction.

I claim as my invention:

1. A reactor comprising a shell, a plurality of spaced imperforate partitions extending transversely across the shell and forming in the shell a plurality of reaction zones, a perforated catalyst supporting member in each of said zones and disposed in spaced relation to the imperforate partitions, a pair of inlet conduits and a pair of outlet conduits extending longitudinally of the shell at spaced points around the periphery of the shell, openings in one of said inlet conduits communicating with some of said zones on one side of the perforated members therein, openings in one of said outlet conduits communicating with the last-named zones on the opposite side of the perforated members therein, openings in the other of said inlet conduits communicating with the remaining reaction zones on one side of the perforated members in these zones, and openings in the other of said outlet conduits communicating with said remaining zones on the opposite side of the last-named perforated members.

2. A reactor comprising a shell, a plurality of spaced imperforate partitions extending transversely across the shell and forming in the shell a plurality of reaction zones, a perforated catalyst supporting member in each of said zones and disposed in spaced relation to the imperforate partitions, a pair of inlet conduits and a pair of outlet conduits extending longitudinally of the shell at spaced points around the periphery of the shell, openings in one of said inlet conduits communicating with alternate reaction zones in the shell on one side of the perforated members therein, openings in one of said outlet conduits communicating with the last-named zones on the opposite side of the perforated members therein, openings in the other of said inlet conduits communicating with the remaining reaction zones on one side of the perforated members in these zones, and openings in the other of said outlet conduits communicating with said remaining zones on the opposite side of the last-named perforated members.

3. An apparatus of the class described comprising, in combination, a substantially cylindrical shell closed at its opposite ends and provided on at least one end with a removable closure member, means forming with said shell, a plurality of conduits extending longitudinally along said shell at spaced points about its inner periphery, a plurality of imperforate partitions extending transversely across and releasably joined to the shell at spaced points along its length, a removable perforate member extending transversely across and supported on the shell above each of said partitions and spaced from the latter, a bed of granular contact material disposed on each of said perforate members with a space provided between the top of the bed and the adjacent partition, means for admitting fluid reactants to some of said conduits, means for removing fluid reaction products from other of said conduits, at least one of said conduits to which fluid reactants are admitted having openings through its walls communicating with the spaces above alternate catalyst beds and at least one other of said conduits to which fluid reactants are admitted having openings through its wall communicating with the spaces above the other alternate catalyst beds, at least one of said conduits from which fluid reaction products are removed having openings through its walls communicating with the spaces below the first-mentioned alternate catalyst beds and at least one other of said conduits from which fluid reaction products are withdrawn having openings in its wall communicating with the space below said other alternate catalyst beds.

4. The reactor defined in claim 1, wherein said conduits are each formed between a circumferential portion of said shell and an auxiliary member joined thereto along its opposite longitudinal edges.

5. The reactor defined in claim 2, wherein said conduits are each formed between a circumferential portion of said shell and an auxiliary member joined thereto along its opposite longitudinal edges.

6. The reactor defined in claim 1, wherein said conduits are formed by elongated tubular members of substantially semi-circular cross-section joined along their longitudinal edges to the shell at spaced points about its circumference.

GEORGE T. TOBIASSON.